United States Patent
Murdock et al.

(10) Patent No.: US 9,384,289 B2
(45) Date of Patent: Jul. 5, 2016

(54) METHOD AND SYSTEM TO IDENTIFY GEOGRAPHICAL LOCATIONS ASSOCIATED WITH QUERIES RECEIVED AT A SEARCH ENGINE

(75) Inventors: Vanessa Murdock, Barcelona (ES); Hugues Bouchard, Barcelona (ES)

(73) Assignee: EXCALIBUR IP, LLC, Sunnyvale, CA (US)

( * ) Notice: Subject to any disclaimer, the term of this patent is extended or adjusted under 35 U.S.C. 154(b) by 1156 days.

(21) Appl. No.: 12/977,851

(22) Filed: Dec. 23, 2010

(65) Prior Publication Data

US 2012/0166416 A1    Jun. 28, 2012

(51) Int. Cl.
*G06F 17/30* (2006.01)
*G06Q 30/02* (2012.01)

(52) U.S. Cl.
CPC ........ *G06F 17/3087* (2013.01); *G06Q 30/0263* (2013.01); *G06Q 30/0277* (2013.01)

(58) Field of Classification Search
USPC ......... 707/673, 696, 706–711, 715, 723, 728, 707/729, 737, 739, 741–746, 748, 759, 707/763–775, 779
See application file for complete search history.

(56) References Cited

U.S. PATENT DOCUMENTS

| | | | |
|---|---|---|---|
| 8,195,654 B1* | 6/2012 | Riley | G06F 17/30864 706/12 |
| 2006/0161599 A1* | 7/2006 | Rosen | 707/201 |
| 2006/0224938 A1* | 10/2006 | Fikes | G06F 17/30876 715/234 |
| 2008/0172357 A1* | 7/2008 | Rechis | G06F 17/3087 |
| 2010/0049609 A1* | 2/2010 | Zhao | G06Q 30/0261 705/14.58 |
| 2010/0318537 A1* | 12/2010 | Surendran et al. | 707/759 |
| 2012/0066199 A1* | 3/2012 | Ramer | G06F 17/30905 707/709 |
| 2012/0158712 A1* | 6/2012 | Karanjkar | G06F 17/30241 707/724 |

* cited by examiner

*Primary Examiner* — Khanh Pham
(74) *Attorney, Agent, or Firm* — Pillsbury Winthrop Shaw Pittman LLP

(57) ABSTRACT

Techniques are provided for prediction locations of users that submit search queries. A query is received at a search engine. An inverted index is searched to identify one or more geographical locations associated with one or more terms of the received query. The inverted index lists a plurality of query terms and one or more geographical locations associated with each query term. Each geographic location that is associated with a listed query term in the inverted index is a determined location for at least one user previously having submitted the listed term in a search query. A geographical location is predicted for a user that submitted the received query based on the identified one or more geographical locations. In this manner, a location is predicted for the user based on similar queries previously submitted by users.

19 Claims, 10 Drawing Sheets

900

902
Identify in the inverted index a plurality of sets of geographical locations associated with the received query 904
Determine a subset of geographical locations that is an intersection of the sets of geographical locations 906
Select a geographical location from the subset of geographical locations to be the predicted location for the user that submitted the received query

912
identify in the inverted index a plurality of geographical locations associated with the received query 914
identify in the inverted index a relevance score for each of the plurality of geographical locations 916
select a geographical location from the plurality of geographical locations having the highest relevance score to be the predicted location for the user that submitted the received query

FIG. 9B

METHOD AND SYSTEM TO IDENTIFY GEOGRAPHICAL LOCATIONS ASSOCIATED WITH QUERIES RECEIVED AT A SEARCH ENGINE

BACKGROUND OF THE INVENTION

1. Field of the Invention

The present invention relates to searching for information using search engines.

2. Background

A search engine is an information retrieval system used to locate documents and other information stored on a computer system. Search engines are useful at reducing an amount of time required to find information. One well known type of search engine is a Web search engine which searches for documents, such as web pages, on the "World Wide Web" (also known as "the Web"). Examples of such search engines include Yahoo! Search™ (at http://www.yahoo.com), Microsoft Bing™ (at http://www.bing.com), Ask.com™ (at http://www.ask.com), and Google™ (at http://www.google.com). Online services such as LexisNexis™ and Westlaw™ also enable users to search for documents provided by their respective services, including articles and court opinions. Further types of search engines include personal search engines, mobile search engines, and enterprise search engines that search on intranets, among others.

To perform a search, a user of a search engine typically enters a query into an entry box of the search engine. The query contains one or more words/terms, such as "hazardous waste" or "country music." The terms of the query are typically selected by the user to as an attempt find particular information of interest to the user. The search engine returns a list of documents relevant to the query. In a Web-based search, the search engine typically returns a list of uniform resource locator (URL) addresses for the relevant documents, which is displayed to the user in a search results page. If the scope of the search resulting from a query is large, the returned list of documents may include thousands or even millions of documents.

Users perform searches using a variety of devices, including mobile devices. Although it is often possible to determine a user's location based on information associated with the device used by the user in performing a search, this determination is generally limited to such device specific information. For searches performed by mobile device users, or other device users, this information may be irrelevant or misleading.

BRIEF SUMMARY OF THE INVENTION

Various approaches are described herein for, among other things, generating indexes that may be accessed to predict locations of users that submit search queries. An index, which may be referred to as an inverted index, stores query terms that were previously submitted by users, and for each query term, stores one or more geographical locations determined for the users that previously submitted the query term. The inverted index may be accessed to predict a location of a user submitting a search query. One or more locations may be obtained from the inverted index that correspond to the terms of the search query, and a location of the user may be predicted from the obtained one or more locations. As such, a location of the user may be determined using the inverted index based on the determined locations of users that submitted similar search queries previously.

In an embodiment, a plurality of inverted indexes may be generated, with each inverted index corresponding to a respective location group. Each location group may correspond to a different location and/or a different level of location granularity (e.g., a particular zip code, city, state, region, country, etc.). Multiple inverted indexes may be accessed each time that a user submits a search query to predict multiple potential locations for the user corresponding to multiple location groups. The multiple potential locations may be analyzed and/or compared to each other, and a most likely location of the user that submitted the search query may be selected.

In one implementation, a method for generating an inverted index is provided. Geographical locations are determined for a plurality of users that submitted search queries. Each submitted search query is annotated with a determined geographical location for a user that submitted the search query. The annotated search queries are grouped according to the determined geographical locations into a plurality of location groups. An inverted index is built for each location group that relates each term of the submitted search queries in the location group to one or more geographical locations determined for the users that submitted the search queries that include the terms.

In another implementation, a method for predicting a geographical location of a user submitting a query to a search engine is provided. A query is received at the search engine. An inverted index is searched to identify one or more geographical locations associated with one or more terms of the received query. The inverted index lists a plurality of query terms and one or more geographical locations associated with each query term. Each geographic location that is associated with a listed query term in the inverted index is a determined location for at least one user previously having submitted the listed term in a search query. A geographical location is predicted for a user that submitted the received query based on the identified one or more geographical locations. In this manner, a location is predicted for the user based on similar queries previously submitted by users.

In still another implementation, a system is provided. The system includes a location determiner, a query grouper, and an index generator. The location determiner is configured to determine geographical locations for a plurality of users that submitted search queries, and to annotate each submitted search query with a determined geographical location for a user that submitted the search query. The query grouper is configured to group the annotated search queries into a plurality of location groups according to the determined geographical locations. The index generator is configured to build an inverted index for each location group. The inverted index relates each term of the submitted search queries in the location group to one or more geographical locations determined for the users that submitted the search queries that include the terms.

Furthermore, the system may include a query receiver and a location predictor. The query receiver is configured to receive a search query from a user. The location predictor is configured to search the inverted index to identify a geographical location associated with the received search query as a predicted location of the user that submitted the search query.

Still further, the system may include an action performer. The action performer is configured to perform an action based at least in part on the predicted location of the user that submitted the search query, such as selecting an advertisement, generating a heat map, and/or other action.

Computer program products are also described herein. The computer program products include a computer-readable medium having computer program logic recorded thereon for generating inverted indexes that enable locations of users that submit search queries to be predicted, for using an inverted index to determine a location of a user that submitted a search query, and for enabling further embodiments, according to the implementations described herein.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 9A shows a flowchart for predicting a geographical location of a user based on an intersection of sets of locations corresponding to terms of a search query, according to an example embodiment.

FIG. 9B shows a flowchart for predicting a geographical location of a user based on relevance scores for geographical locations, according to an example embodiment.

Figure 1:
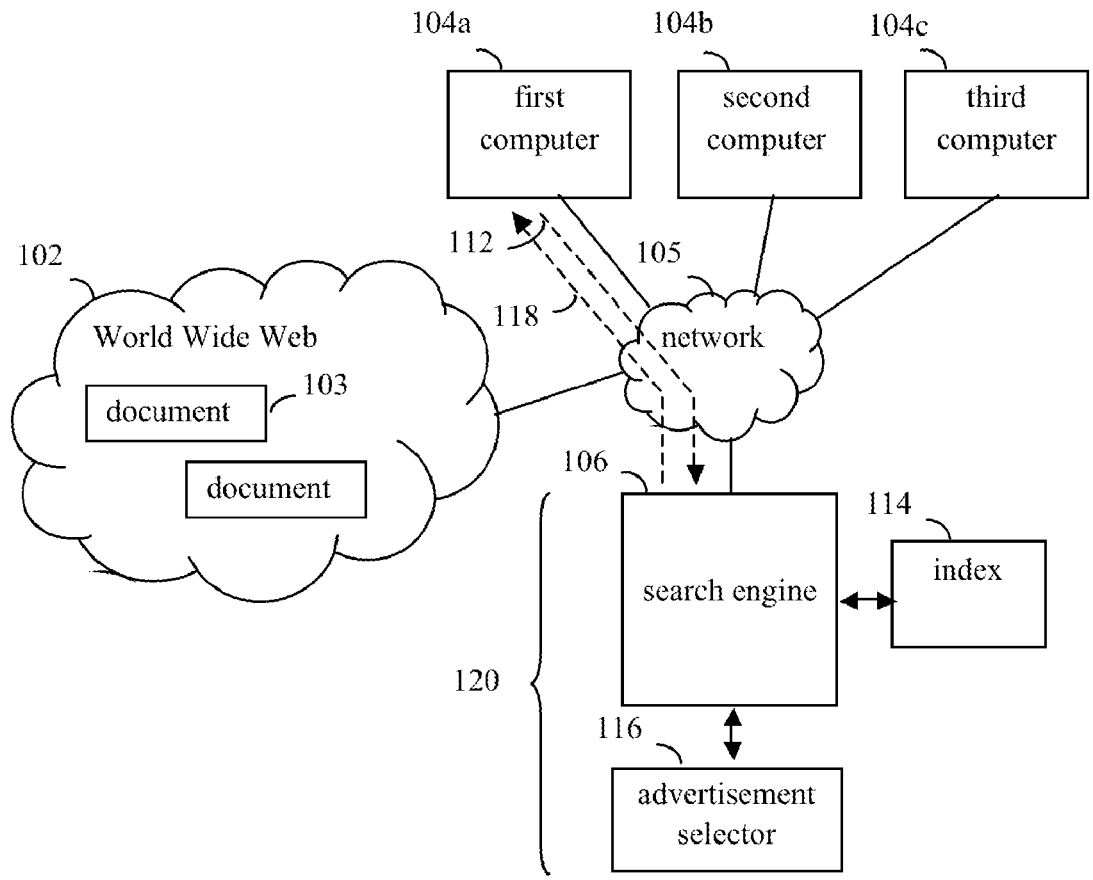
FIG. 1 shows a block diagram of an example search network, according to an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Example embodiments are described in the following sections. It noted that the section/subsection headings provided herein are not intended to be limiting. Embodiments are described throughout this document, and any type of embodiment may be included under any section/subsection.

II. Example Embodiments for Generating an Inverted Index and for Determining Locations of Users Submitting Received Queries Embodiments of the present invention enable the determination of geographical locations for users based on their queries, and the queries of other users, in search environments. Embodiments may be implemented in a variety of environments, including search environments. For instance, FIG. 1 shows a search network 100, which is an example environment in which user location determination may be implemented. As shown in FIG. 1, network 100 includes a search system 120. Search system 120 is configured to provide search results for a received search query 112, and to provide matching advertisements. As shown in FIG. 1, search system 120 includes a search engine 106 and an advertisement selector 116. These and further elements of network 100 are described as follows.

As shown in FIG. 1, one or more computers 104, such as first-third computers 104a-104c, are connected to a communication network 105. Network 105 may be any type of communication network, such as a local area network (LAN), a wide area network (WAN), or a combination of communication networks. In embodiments, network 105 may include the Internet and/or an intranet. Computers 104 can retrieve documents from entities over network 105. Computers 104 may each be any type of suitable electronic device, typically having a display and having web browsing capability, such as a desktop computer (e.g., a personal computer, etc.), a mobile computing device (e.g., a personal digital assistant (PDA), a laptop computer, a notebook computer, a tablet computer (e.g., an Apple iPad™), a netbook, etc.), a mobile phone (e.g., a cell phone, a smart phone, etc.), or a mobile email device. In embodiments where network 105 includes the Internet, numerous documents (including a document 103) that form a portion of World Wide Web 102, are available for retrieval by computers 104 through network 105. On the Internet, documents may be identified/located by a uniform resource locator (URL), such as http://www.documents.com/documentX, and/or by other mechanisms. Computers 104 can access document 103 through network 105 by supplying a URL corresponding to document 103 to a document server (not shown in FIG. 1).

As shown in FIG. 1, search engine 106 is coupled to network 105. Search engine 106 accesses a stored index 114 that indexes documents, such as documents of World Wide Web 102. A user of computer 104a who desires to retrieve one or more documents relevant to a particular topic, but does not know the identifier/location of such a document, may submit a query 112 to search engine 106 through network 105. For instance, the user may enter query 112 into a search engine entry box displayed by computer 104a (e.g., by a web browser). Search engine 106 receives query 112, and analyzes index 114 to find documents relevant to query 112. For example, search engine 106 may determine a set of documents indexed by index 114 that include terms of query 112. The set of documents may include any number of documents, including tens, hundreds, thousands, or even millions of documents. Search engine 106 may use a ranking or relevance function to rank documents of the retrieved set of documents in an order of relevance to the user. Documents of the set determined to most likely be relevant may be provided at the top of a list of the returned documents in an attempt to avoid the user having to parse through the entire set of documents.

Search engine 106 may be implemented in hardware, software, firmware, or any combination thereof. For example, search engine 106 may include software/firmware that executes in one or more processors of one or more computer systems, such as one or more servers. Examples of search engine 106 that may be accessible through network 105 include, but are not limited to, Yahoo! Search™ (at http://www.yahoo.com), Microsoft Bing™ (at www.bing.com), Ask.com™ (at http://www.ask.com), and Google™ (at http://www.google.com).

Figure 2:
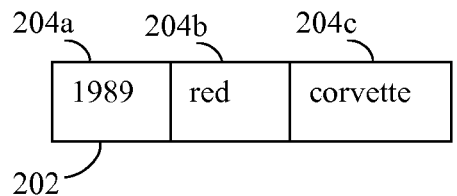
FIG. 2 shows an example query that may be submitted by a user to a search engine.

FIG. 2 shows an example search query 202 that may be submitted by a user of one of computers 104a-104c of FIG. 1 to search engine 106. Query 202 is an example of query 112, and includes one or more terms or features 204, such as first, second, and third features 204a-204c shown in FIG. 2. Any number of features 204 may be present in a query. As shown in FIG. 2, features 204a-204c of query 112 are "1989," "red," and "corvette." Search engine 106 applies these features 204a-204c to index 114 to retrieve a document locator, such as a URL, for one or more indexed documents that match 1989," "red," and "corvette," and may order the list of documents according to a ranking. The list of documents may be displayed to the user in response to query 202.

Furthermore, in a sponsored search environment, one or more advertisements may be selected for display to the user along with the documents displayed to the user in response to query 112. "Sponsored search" refers to a form of Internet advertising/marketing that enables advertisers to increase their visibility in the results page of a search engine query. In sponsored search, an advertiser may pay or provide other consideration for having information, such as a link to a website of the advertiser, appear in a sponsored section of the results webpage for one or more particular queries. The sponsored section is prominently displayed in the results page, to enable the user to easily view and interact with the displayed information of the advertiser. In this manner, an advertiser is enabled to provide advertisements to users that are directly related to their queries, and a search engine owner/operator is enabled to further monetize the search engine.

For example, network 100 may include advertisement selector 116 that is configured to select advertisements related to received queries for display. Advertisement selector 116 may receive query 112 from search engine 106. Advertisement selector 116 may include a mapping of queries to advertisers/advertisements. Advertisement selector 116 may determine from the mapping whether advertisements are present that correspond to query 112, and if so, to select one or more of the corresponding advertisements to be displayed as sponsored search results for query 112. Advertisement selector 116 may provide an indication of the selected advertisements to search engine 106. Search engine 106 may generate a search results page 118 that is transmitted to first computer 104a to be displayed (e.g., by a browser), and that includes any determined search results and selected advertisements for query 112.

Figure 3:
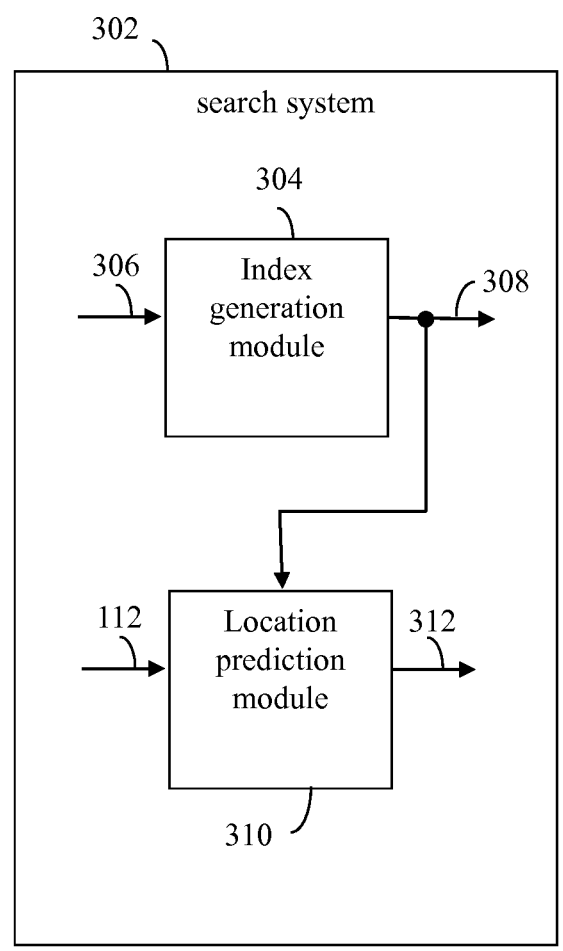
FIG. 3 shows a block diagram of a search system, according to an example embodiment.

In embodiments, search system 120 may be configured to determine geographical locations for users submitting queries such as query 112. For instance, FIG. 3 shows a block diagram of a search system 302, according to an example embodiment. Similarly to search system 120 of FIG. 1, search system 302 may include a search engine (e.g., search engine 106), an index (e.g., index 114) and an advertisement selector (e.g., advertisement selector 116). Furthermore, as shown in FIG. 3, search system 302 may include an index generation module 304, and/or a location prediction module 310. These features of search system 302 are described as follows.

Index generation module 304 is configured to generate an index that may be used to predict or determine locations from which users are submitting their queries. Index generation module 304 receives context information 306, which includes information about the locations of users that previously submitted queries, and generates an inverted index 308. Inverted index 308 relates the received location information to search terms within the received queries, and may be used to predict locations of users that submit subsequent queries.

For instance, as shown in FIG. 3, location prediction module 310 receives inverted index 308. Using inverted index 308, location prediction module 310 is capable of predicting geographical locations for users who submit queries. For instance, as shown in FIG. 3, location prediction module 310 may receive query 112 (e.g., directly, or from a search engine such as search engine 106), and may return a predicted geographical location 312 predicted for the user submitting query 112 based on the location history for previously submitted queries in inverted index 308. In further embodiments, location prediction module 310 may perform one or more actions based on predicted geographical location 312.

Example embodiments for index generation module 304 and location prediction module 310, and for further techniques for generating inverted indexes and predicting locations of users that submit search queries, are described in further detail in the following sections.

III. Example System and Method Embodiments for Generating an Inverted Index

Figure 4:
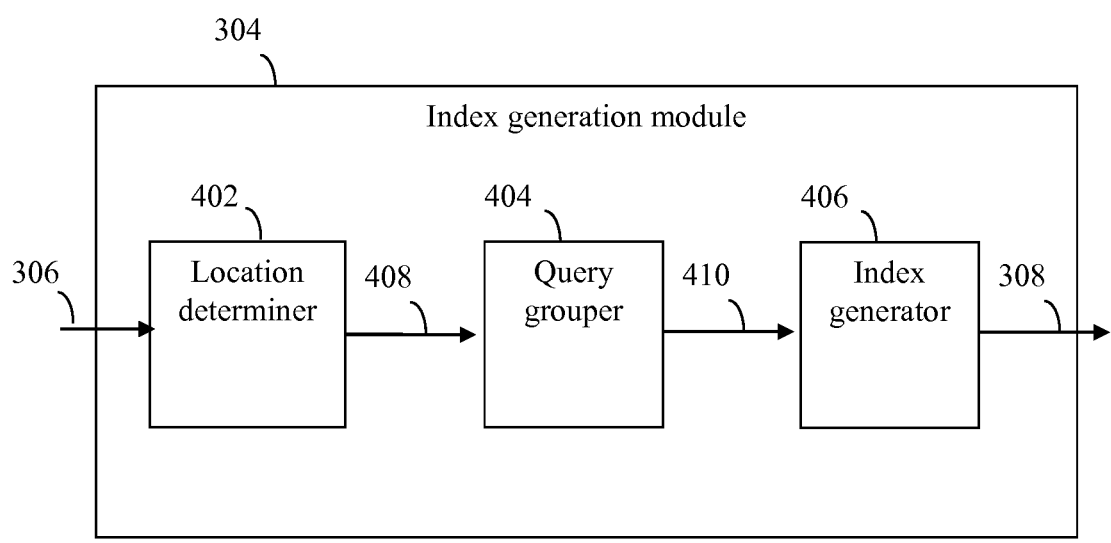
FIG. 4 shows a block diagram of an index generation module, according to an example embodiment.

Index generation module 304 may be configured in various ways to generate inverted index 308 according to embodiments. For instance, FIG. 4 shows a block diagram of index generation module 304, according to an example embodiment. As shown in FIG. 4, index generation module 304 includes a location determiner 402, a query grouper 404, and an index generator 406. These elements of index generation module 304 are described as follows.

As shown in FIG. 4, location determiner 402 receives context information 306 for previously submitted queries (e.g., a plurality of search queries previously submitted to a search engine, such as search engine 106 of FIG. 1). Context information 306 includes the terms of the previously received queries and includes further information associated with the queries, such as information regarding the users submitting the previously received queries (e.g., an IP (Internet protocol) address associated with the computing device where a query was submitted, a user ID of a user account for a user that submitted a query, etc.), and/or further metadata. Location determiner 402 is configured to determine locations from which the previously submitted queries were submitted by users based on context information 306, and to output determined geographic locations 408. Location determiner 402 may identify or determine the locations of the users that submitted the previously submitted queries based on context information 306 in a number of ways, including determining location information based on the IP address associated with the computer that submitted a query, determining location information provided in a profile of the user that submitted the query (e.g., location information stored in a user account), analyzing query logs at a search engine annotated with query locations, and/or other context information.

It is noted that the location determined by location determiner 402 for a user when the user submits a first query may be different than the location determined for the same user when the user submits a different query. This is because a location of the user may change between query submissions. As such, a variety of factors may be taken into account in determining a user location when submitting a query, as would be known to persons skilled in the relevant art(s).

Geographic locations 408 output by location determiner 402 includes each submitted search query, and an annotation of each search query with a determined geographical location for a user that submitted the search query. As such, determined geographic locations 408 may include a plurality of pairs of determined user location and submitted query (user location-query pairs). It is noted that more than one location may be indicated for each user location-query pair in determined geographic locations 408. For example, based on a determined location for the user source of a query (such as the location of "Seattle"), location determiner 402 may determine a hierarchy of locations that include the location, such as zip code, city, county, state, region, country, continent, etc. For instance, with respect to Seattle as the determined location for a user issuing a query, location determiner 402 may include a further location indication for the zip code (e.g., 98102), for the city of Seattle, for the state of Washington, for the country USA, and so on, for the user location-query pair. In addition to known locations such as cities, states, regions (e.g., "Silicon Valley"), and so on, location determiner 402 may assign locations newly created or unique to the search system 302. For example, location determiner 402 may form unique groupings of known locations, may split known locations, and so on. Queries may be associated with any number of hierarchical tiers of locations in user location-query pairs.

Query grouper 404 receives determined geographic locations 408. Query grouper 404 is configured to group the annotated search queries received in determined geographic locations 408 according to their corresponding determined geographical locations. As shown in FIG. 4, query grouper 404 generates location groups 410, which includes one or more location groups. Each location group includes one or more user location-query pairs that have a determined location within a location represented by the location group. For instance, location groups 410 may be represented as a list of the locations included in determined geographic locations 408, and for each location in the list, a list of the one or more queries for which the location was determined by location determiner 402.

For example, determined geographic locations 408 may include the following search query and corresponding determined location information shown, shown in Table 1 below:

TABLE 1

| Query | Location |
|---|---|
| coffee shop | Seattle |
| Amighetti's | 63011 |
| smoked salmon | Alaska |
| Mariners | Seattle |
| smoked salmon | Seattle |
| . . . | . . . |

In this example, query grouper 404 may generate location groups 410 to include the following location groups and associated queries, shown in Table 2 below:

TABLE 2

| Location Groups | Associated Queries |
|---|---|
| Seattle | coffee shop, Mariners, smoked salmon |
| 63011 | Amighetti's |
| Alaska | smoked salmon |
| . . . | . . . |

If one or more queries originated from the same location, the one or more queries are included in location groups 410 for the location group. For instance, as shown in the example above, the queries "coffee shop", "Mariners", and "smoked salmon" originated from Seattle, and thus both are listed in location groups 410 for the location group "Seattle."

Note that in an embodiment, locations may be grouped by location type, such as zip code, city, state, etc. using corresponding location groups of location groups 410. When grouping locations by location type, queries are listed in all of the location groups in which they belong. In other words, a location group that is higher in the location hierarchy (e.g., state) includes all of the location groups lower in the hierarchy (e.g., city or zip code) that are within the location. For example, a query determined to have issued from zip code 80203 is included in the location group for zip codes (e.g., in a location group that represents 80203). The query also is included in the location group for the city that includes the zip code (e.g., in a location group representing Denver). The query also is included in the location group for the state that includes the city (a location group representing Colorado). That query may also be included in the location group for the country that includes the state (e.g., a location group representing the United States). As such, multiple location groups may be generated that each correspond to a particular group type representing a particular location.

Index generator 406 receives location groups 410, and stores the information included in the location groups as an inverted index 308. For example, index generator 406 may invert the information of location groups 410 to generate an inverted index, or may store the information of location groups 410 in a manner such that it may be accessed as inverted index 308 (e.g., by keying on query terms). If multiple location groups have been generated (e.g., corresponding to different location types), an inverted index 308 may be generated for each location group of location groups 410. Inverted index 308 is generated as a list of the queries included in a corresponding location group, and for each query in the list, a list of the one or more locations for which the query was listed in the corresponding location group. For instance, further to the example above, index generator 406 may generate inverted index 308 as shown in Table 3 as follows:

TABLE 3

| Query | Locations |
|---|---|
| coffee shop | Seattle |
| Amighetti's | 63011 |
| smoked salmon | Alaska, Seattle |
| Mariners | Seattle |
| ... | ... |

In the above example of inverted index 308, each row is an entry corresponding to a query, with each query having one or more associated locations. As shown in the example above, each particular query may appear once in inverted index 308, and each location that was associated with the query in location groups 410 is listed for the query in inverted index 308. For instance, locations "Alaska" and "Seattle" are both listed for the query "smoked salmon."

Note that in the above example of inverted index 308, queries that include multiple terms are listed together for an entry. In another embodiment, inverted index 308 may list each query term separately as an entry. For instance, index generator 406 may generate inverted index 308 as shown in Table 4 as follows, where each query term is listed separately as an entry with one or more associated locations:

TABLE 4

| Query term | Locations |
|---|---|
| coffee | Seattle |
| shop | Seattle |
| Amighetti's | 63011 |
| smoked | Alaska, Seattle |
| salmon | Alaska, Seattle |
| Mariners | Seattle |
| ... | ... |

As described above, if multiple location groups have been generated (e.g., corresponding to different location types), an inverted index 308 may be generated for each location group. That is, every location group is associated with an inverted index that includes entries (also referred to as "pseudo-documents") that each includes a query and one or more locations for each query, the locations all being included in the location of the location group. For example, index generator 406 may generate an inverted index 308 for one or more countries in the world, for one or more of the zip codes in the USA, one or more of the voting districts in the USA, and so on. An inverted index 308 generated for "Washington state" may include a list of queries, and for each query, a list of locations that are included in Washington state (including Seattle). An inverted index 308 generated for "Seattle" may include a list of queries, and for each query, a list of locations that are included in Seattle. For instance, the above example of Table 3 may be an inverted index 308 for a location group of the United States.

In some embodiments, index generator 406 may also add location relevance information to generated indexes. The location relevance information may provide a relevance score or metric that indicates the relevancy or importance of a location with respect to queries from the location included in the particular inverted index 308. Thus, an entry for a specific location within an index may include a listing of tuples that associate queries or query terms to their assigned locations and the relevance of the locations to the queries.

Figure 5:
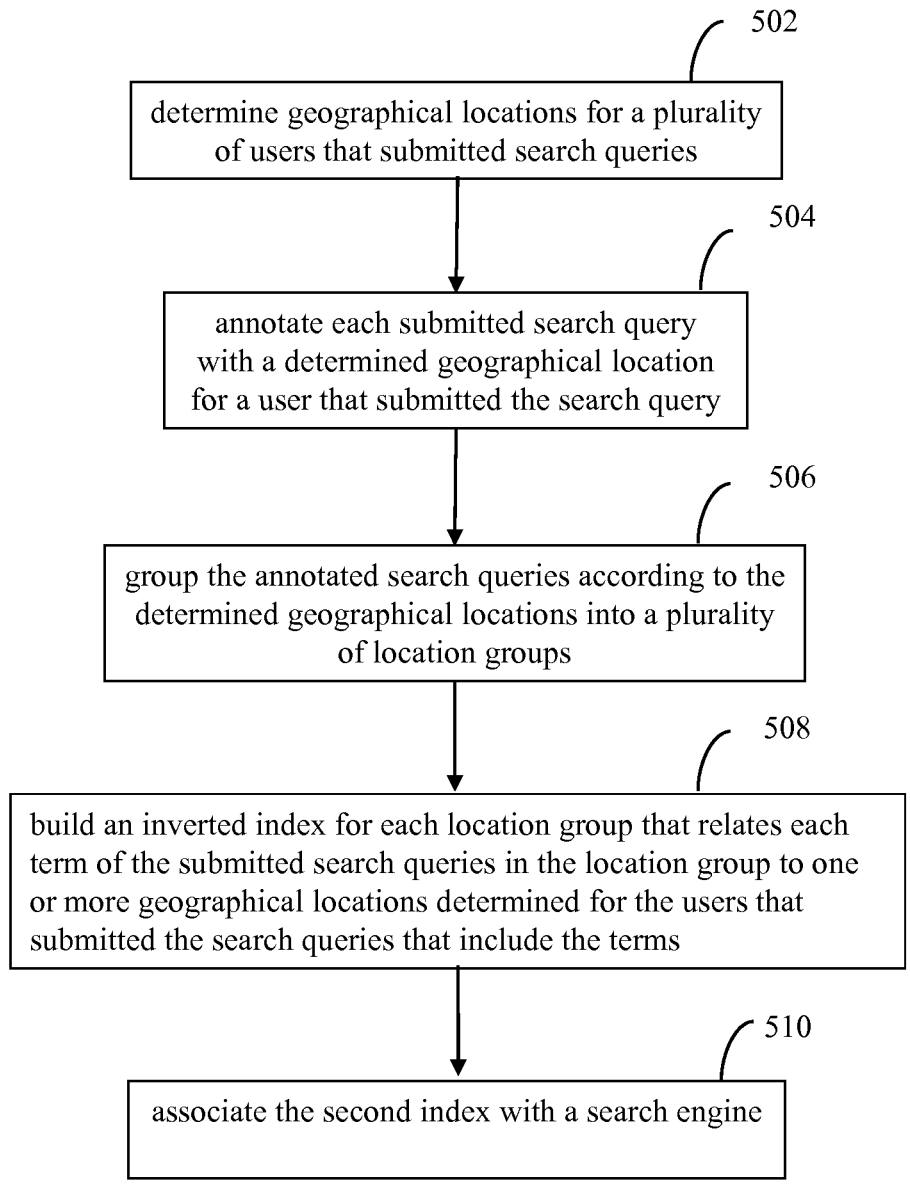
FIG. 5 shows a flowchart for building an inverted index, according to an example embodiment.

As such, index generation module 304 may receive context information 306 for previously submitted queries and return an inverted index 308 that relates the received location information to search terms within the received queries. For instance, index generation module 304 may operate according to FIG. 5. FIG. 5 shows a flowchart 500 for building an inverted index, according to an example embodiment. Flowchart 500 is described as follows with respect to index generation module 304 of FIG. 4 for illustrative purposes. Further structural and operational embodiments will be apparent to persons skilled in the relevant art(s) based on the following description of flowchart 500.

Flowchart 500 begins with step 502. In step 502, geographical locations are determined for a plurality of users that submitted search queries. For example, as described above, based on context information 306, location determiner 402 determines locations for users that submitted queries.

In step 504, each submitted search query is annotated with a determined geographical location for a user that submitted the search query. For example, as described above, and shown in FIG. 4, location determiner 402 annotates the submitted queries with the determined locations for users that submitted the queries to generate determined geographic locations 408.

In step 506, the annotated search queries are grouped according to the determined geographical locations into a plurality of location groups. For example, as described above, and shown in FIG. 4, index generator 406 generates location groups 410 that group the annotated search queries received in determined geographic locations 408 according to their corresponding determined geographical locations.

In step 508, an inverted index is built for each location group that relates each term of the submitted search queries in the location group to one or more geographical locations determined for the users that submitted the search queries that include the terms. For example, index generator 406 may invert location groups 410 generated by index generator 406 to generate one or more inverted indexes 308. Each inverted index 308 includes a list of one or more determined user locations for each query term of the search queries submitted by the users. Multiple inverted indexes 308 may be generated that are each associated with a particular location group or tier (e.g., zip code, city, state, country, etc.).

In step 510, the second index is associated with a search engine. For example, inverted index 308 (or multiple inverted indexes 308) is associated with a search engine (e.g., search engine 106 of FIG. 1). The search engine may use inverted index 308 to determine locations for queries when the search engine receives queries.

Figure 6:
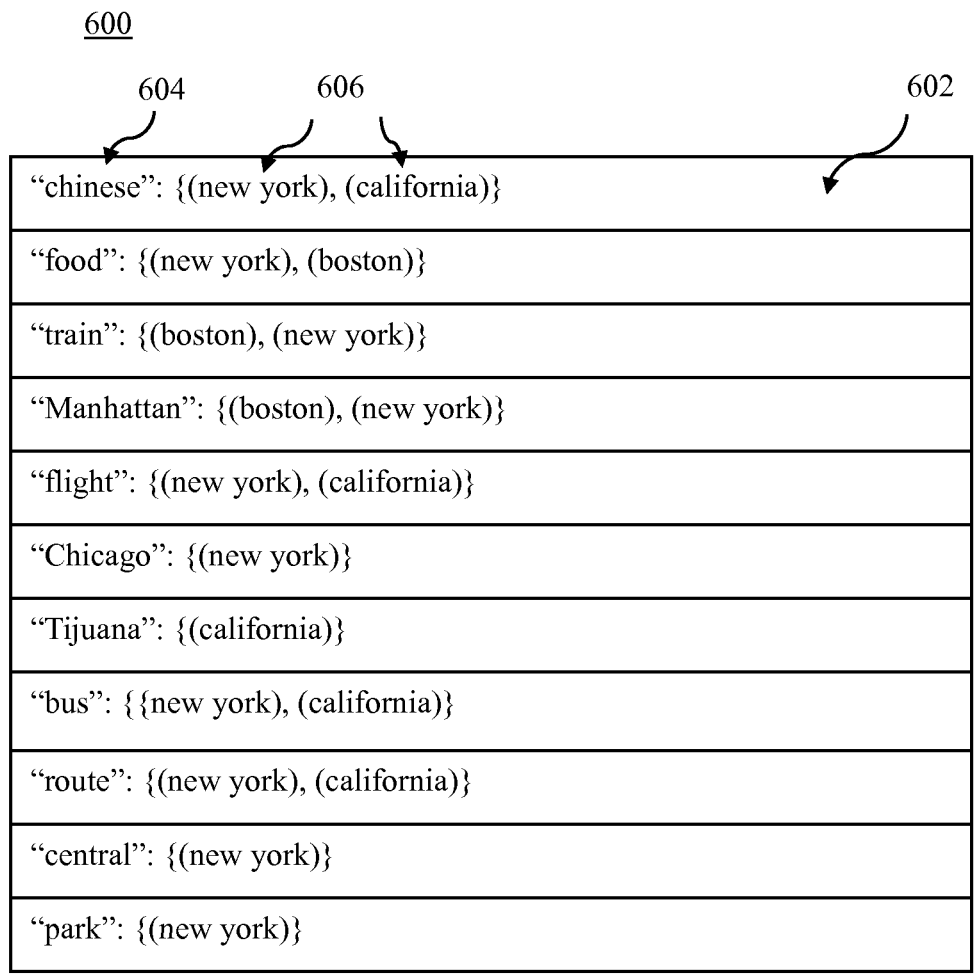
FIG. 6 shows an inverted index, according to an example embodiment.

Flowchart 500 describes steps implemented by index generation module 304 when generating one or more inverted indexes used to identify or determine locations for queries received at a search engine. FIG. 6 shows a table 600 that is an example of an inverted index, such as inverted index 308, according to an embodiment. Table 600 is provided for purposes of illustration, and is not intended to be limiting.

Table 600 is an inverted index that enables locations to be assigned to queries received at a search engine. Table 600 is an inverted index for a location group associated with the United States. Table 600 includes a plurality of entries 602 that each contains corresponding information 604. Information 604 for each entry 602 includes a search term 604 and one or more corresponding locations 606. In some cases (not shown) entries 602 may include tuples for search terms, where the tuples include the location information and relevance scores and/or other metrics with respect to the relevance or importance of the locations to the search queries. For instance, an example of inverted index 308 having such tuples is shown as follows in Table 5 (based on the example of Table 4 shown above):

TABLE 5

| Query term | Tuples |
|---|---|
| coffee | (Seattle, .78) |
| shop | (Seattle, .12) |
| Amighetti's | (63011, .22) |
| smoked | (Alaska, .44) (Seattle, .37) |
| salmon | (Alaska, .57) (Seattle, .42) |
| Mariners | (Seattle, .75) |
| ... | ... |

As shown in the above example, each entry includes a query and one or more tuples. Each tuple includes a location and a relevance score as a relevance metric indicating how relevant the location is to the query. For instance, the relevancy of the location "Seattle" to the query "coffee" is relatively high (relevance score of 0.78), while the relevancy of the location "Seattle" to the query "shop" is relatively low (relevance score of 0.12).

The relevance scores may be determined in any number of ways. For example, index generation module 304 may include a relevance metrics generator that generates relevance scores and/or other metrics for locations with respect to queries. The relevance metric generator may base relevance scores on various criteria. For instance, queries that are associated with identifying locations, directions, landmarks, and so on (e.g., "bus route to central park") may receive higher scores, whereas queries associated with general new topics (e.g., "Oscar winners 2008"), may receive lower scores. Of course, further reasons or factors may be utilized to determine relevance scores.

Embodiments for the use of inverted indexes that relate search terms to user locations are described in the following section.

Figure 7:
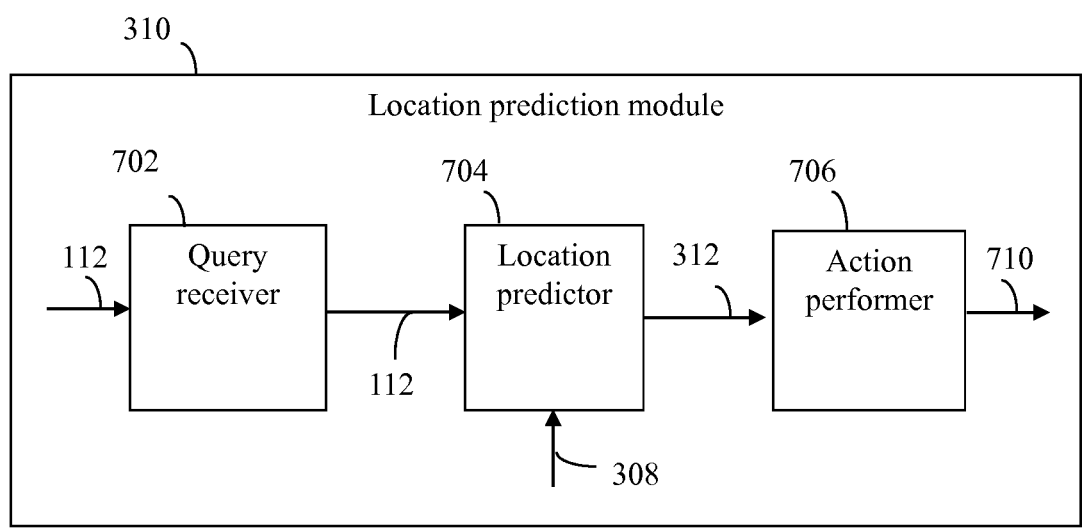
FIG. 7 shows a block diagram of a location prediction module, according to an example embodiment.

IV. Example Embodiments for Determining the Location of Users Submitting Queries Location prediction module 310 of FIG. 3 may be configured in various ways to predict locations of users that submit queries, in embodiments. For instance, FIG. 7 shows a block diagram of location prediction module 310, according to an example embodiment. As shown in FIG. 7, location prediction module 310 includes a query receiver 702, a location predictor 704, and an action performer 706. These elements of location prediction module 310 are described as follows.

Query receiver 702 is configured to receive queries for location prediction module 310, such as queries supplied to a search engine that a user submits to obtain search results. For instance, as shown in FIG. 7, query receiver 702 may receive query 112. In an embodiment, query receiver 702 may be included in the front end of a search engine, or may be located elsewhere. Query receiver 702 may be an API (application programming interface), a front end of a web service provided by location prediction module 310, or may be configured in other manner, and may optionally include a communication interface for communicating over a network (such as described elsewhere herein). As shown in FIG. 7, query receiver 702 transmits received query 112 to location predictor 704. In some embodiments, query receiver 702 may not be present, such as where index generation module 304 and a search engine that receives query 112 are located in a common computer system, and thus location predictor 702 can receive query 112 without query 112 being transmitted over a network.

As shown in FIG. 7, location predictor 704 receives query 112 and inverted index 308. Location predictor 704 predicts a location for a user that submitted query 112, and outputs the location as predicted geographical location 312. Location predictor 704 searches inverted index 308 of FIGS. 3 and 4 to identify one or more locations associated with query 112. For instance, for a received query of "coffee shop", location predictor 704 may locate the query entry of "coffee shop" in inverted index 308, and output each location associated with "coffee shop" in inverted index 308 as predicted geographical location 312. In an embodiment, location predictor 704 may process each term of a multi-term search query separately to determine a set of one or more locations for each term, to determine a plurality of sets of locations for the multi-term search query. Location predictor 704 may determine an intersection of the determined sets of locations that is a subset of the determined locations. The one or more locations in the intersection of locations may be output by location predictor 704 as predicted geographical location 312. Location predictor 704 may optionally process relevance scores or metrics associated with the identified locations in inverted index 308. In an embodiment, location predictor 704 may determine a plurality of locations for a received query from inverted index 308, and may select one of the locations to be a most likely source for the query, such as by selecting the location having the highest relevance score. Location predictor 704 may output the determined most likely source for the query as predicted geographical location 312.

For example, for a received query of "Chinese food," location predictor 704 may analyze Table 600 in FIG. 6 to identify the entries 602 for the terms, "Chinese" and "food", and to identify an intersection of the locations associated with those terms. In this example, a single location of "New York" is included in the intersection. As such, location predictor 704 may determine that the query came from New York. Using various methods described herein, such as the intersection of all matching search terms, the use of relevance metrics, and so on, location predictor 704 may determine one or more locations for received queries, and transmit predicted geographical location 312 to action performer 706.

Action performer 706 is optionally present. When present, action performer 706 may perform an action 710 in response to predicted geographical location 312. Action performer 706 may be configured to perform one or more of a variety of different actions. For instance, in one embodiment, action performer 706 may generate, update, and/or display a heat map that displays geographical location information for received queries. For instance, action performer 706 may generate a map displayed by a display of a computing device that indicates the geographical locations identified in inverted index 308 for the terms of query 112. The display may indicate one or more of the locations displayed in the map as "hot" or "cold" (e.g., close or far, by color, such as red and blue) with regard to their relative probability or likelihood as being the source of the corresponding query (e.g., based on their corresponding relevance scores and/or other metrics). Such a heat map enables a visualization of query trends at the time the query is received, and may enable a user to select a predicted geographical location from the map based on the "hot" and/or "cold" indications. In another embodiment, action performer 706 may generate or update a report that provides an analysis of query trends. In still another embodiment, action performer 706 may be configured to select and/or display an advertisement associated with the determined query and the location of predicted geographical location 312. In still another embodiment, action performer 706 may update a list of search results based on the determined query. In further embodiments, action performer 706 may perform further and/or alternative actions.

Figure 8:
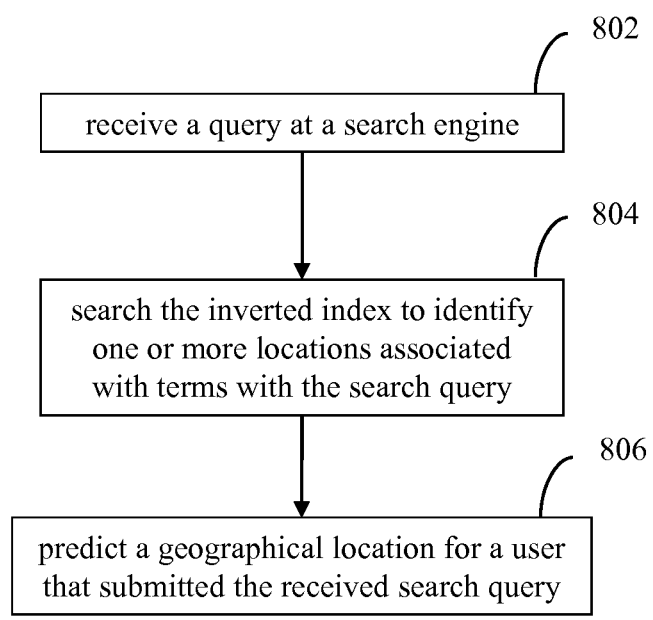
FIG. 8 shows a flowchart for predicting the geographical location of a user, according to an example embodiment.

As such, location prediction module 310 may receive a query 112 received at a search engine, may generate a predicted geographical location 312 for query 112, and may perform an action 710 based on predicted geographical location 312. For instance, location prediction module 310 may operate according to FIG. 8. FIG. 8 shows a flowchart 800 for determining the geographical location for a user, according to an example embodiment. Flowchart 800 is described as follows with respect to location prediction module 310 for illustrative purposes. Further structural and operational embodiments will be apparent to persons skilled in the relevant art(s) based on the following description of flowchart 800. Note that flowchart 800 may be repeated for a received query for each of a plurality of inverted indexes that correspond to different location groups.

Flowchart 800 begins with step 802. In step 802, a query is received from a search engine. For example, as shown in FIG. 7, query receiver 702 receives a query 112. Query 112 may include one or more query terms.

In step 804, the inverted index is searched to identify one or more locations associated with terms with the search query. For example, the location predictor 704 and searches inverted index 308 to identify one or more entries that contain terms from within the received search query, and for each term, identifies the geographic locations in inverted index 308 that are associated with the term.

In step 806, a geographical location for a user that submitted the received search query is predicted. As described above, location predictor 704 is configured to determine a location corresponding to the user that submitted received search query based on the one or more locations identified in inverted index 308 associated with terms of the search query. For example, in an embodiment, location predictor 704 may determine an intersection of the locations identified for each term to predict the location. In this and/or other embodiments, location predictor 704 may consider relevance scores when predicting a location for a user that submitted a query. Location predictor 704 outputs predicted geographical location 312, which includes the determined location. When step 804 is repeated for a plurality of inverted indexes 308 corresponding to different location groups, location predictor 704 may determine an intersection of the locations identified for the different location groups to predict the location, and/or may predict the location of the user to be the location predicted for the most granular location group of the location groups (e.g., choosing the location predicted for a location group corresponding to a relatively smaller region such as a zip code over the locations predicted for location groups corresponding to relatively larger regions such as a city, a state, a country, etc.).

FIG. 9A shows a flowchart 900 for predicting a geographical location of a user based on an intersection of sets of locations corresponding to terms of a search query, according to an example embodiment. In an embodiment, flowchart 900 can be performed by location predictor 704, and is described as follows.

In step 902, a plurality of sets of geographical locations associated with the received query is identified in the inverted index. For example, as described above, location predictor 704 may identify a set of geographical locations in inverted index 308 for each query term of query 112. Each set of geographical locations may include one or more locations. For instance, referring to the example of FIG. 6, for the query "Chinese food", location predictor 704 may identify New York and California as a location set for the term "Chinese," and may identify New York and Boston as a location set for the term "food."

In step 904, a subset of geographical locations that is an intersection of the sets of geographical locations is determined. As described above, location predictor 704 may perform an intersection of the sets of geographical locations determined for the terms of query 112. For instance, continuing the example of "Chinese food" as a query, an intersection of the location sets for "Chinese" and "food" is a subset of locations that includes "New York."

In step 906, a geographical location is selected from the subset of geographical locations to be the predicted location for the user that submitted the received query. As described above, location predictor 704 may select a geographical location from the determined subset to be the predicted location for the user that submitted query 112. For instance, continuing the example of "Chinese food" as a query, the subset of locations includes a single location of "New York." As such, in this example, the location of "New York" is predicted to be the location of the user that submitted the query "Chinese food." If additional locations were included in the subset of locations, the predicted location may be selected from the subset of location as the location having the highest relevance score and/or based on other metric. Location predictor 704 may output the location as predicted geographical location 312.

In another embodiment, FIG. 9B shows a flowchart 910 for predicting a geographical location of a user based on relevance scores for geographical locations, according to an example embodiment. In an embodiment, flowchart 910 can be performed by location predictor 704, and is described as follows.

Flowchart 910 begins with step 912. In step 912, a plurality of geographical locations associated with the received query is identified in the inverted index. For example, as described above, location predictor 704 may identify a plurality of geographical locations in inverted index 308 for the one or more query terms of query 112.

In step 914, a relevance score for each of the plurality of geographical locations is identified in the inverted index. For example, as described above, relevance scores may have been assigned to locations included in inverted index 308. Location predictor 704 may use the assigned relevance scores as relevance scores for the identified geographical locations. Location predictor 704 may consider one or more further factors to determine a relevance score for each candidate geographical location, such as frequency of matching terms, a weight of matching terms, a combination of the relevance scores for the individual terms, and/or other factors.

In step 916, a geographical location is selected from the plurality of geographical locations having the highest relevance score to be the predicted location for the user that submitted the received query. For example, location predictor 704 may select a location to be a predicted location for the user that submitted query 112 based on a ranking of the relevance scores for the identified geographical locations. For instance, location predictor 704 may select the geographical location having the highest relevance score to be output as predicted geographical location 312.

As described above, in some embodiments, location prediction module 310 may also perform actions in response to location predictions made by location predictor 704, such as via action performer 706. For example, FIG. 10 shows a flowchart for performing an action based on a determined geographical location for a search query, according to an example embodiment.

Figure 10:
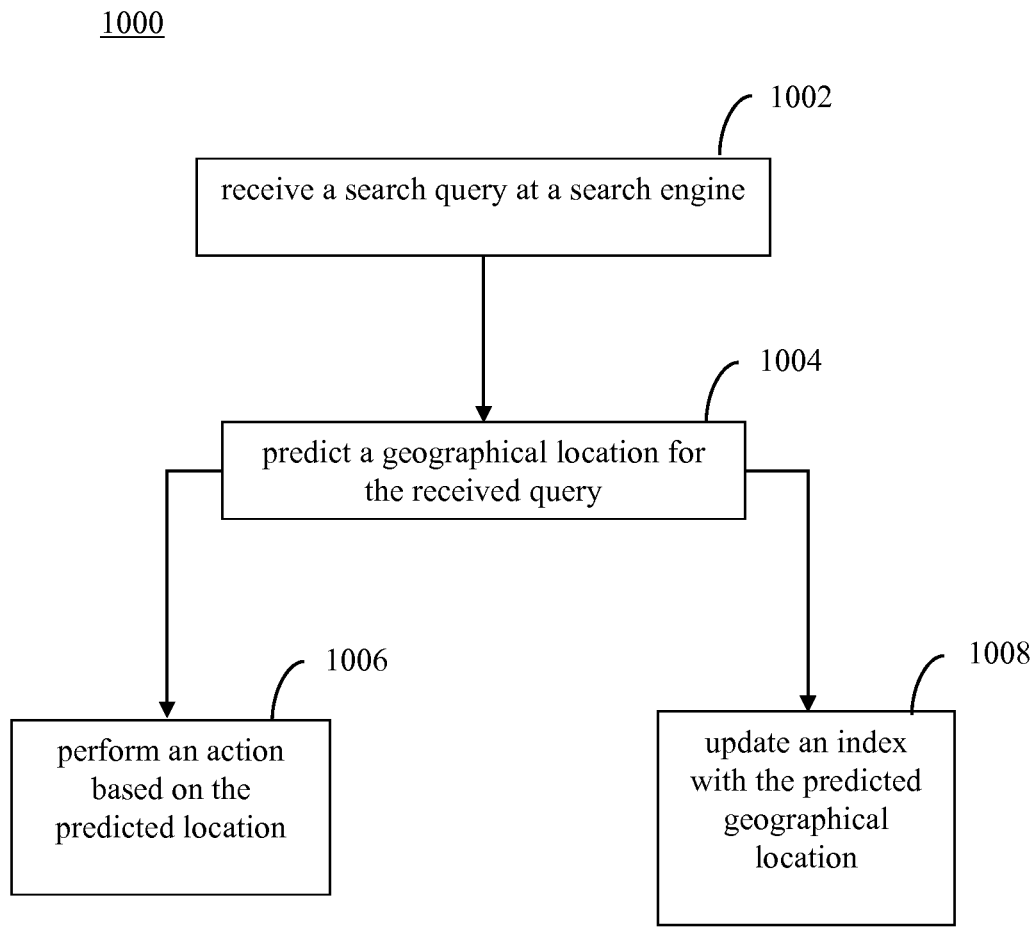
FIG. 10 shows a flowchart for performing an action based on a predicted geographical location for a search query, according to an example embodiment.

FIG. 10 begins with step 1002. In step 1002, a search query at a search engine is received. For example, as shown in FIG. 7, query receiver 702 may receive query 112.

In step 1004, a geographical location for the received query is determined. For example, location predictor 706 may predict a location of the user that submitted query 112 based on the processes shown in FIG. 8, 9A, or 9B, combinations thereof, or according to other embodiment, and the predicted location may be output as predicted geographical location 312.

In step 1006, an action is performed based on the determined location. For example, action performer 706 may perform an action based on predicted geographical location 312. As described above, action performer 706 may perform one or more actions, such as generating a heat map that illustrates identified locations, that illustrates trend information associated with the locations of received queries, by updating a report that analyzes location trends in queries received by search engines, by displaying an advertisement based on a determined location, by updating a list of results of a search for information based on the determined location, and so on.

In step 1008, an index is updated with the determined geographical location. For example, the entries of inverted index 308 corresponding to the received query may be updated with predicted geographical location 312. For instance, entries for the full query and/or for each query term the received query in inverted index 308 may have the determined geographical location added to their corresponding lists of locations, and/or relevancy information in inverted index 308 for the tuples of the determined location and query terms may be updated (e.g., may be increased), etc. Such updating provides the index with an ever growing and relevant index of information in which locations can be determined for received search queries.

V. Example Computer Implementations

Search engine 106, advertisement selector 116, search system 120, search system 302, index generation module 304, location prediction module 310, location determiner 402, query grouper 404, index generator 406, query receiver 702, location predictor 704, and action performer 706 may be implemented in hardware, software, firmware, or any combination thereof. For example, search engine 106, advertisement selector 116, search system 120, search system 302, index generation module 304, location prediction module 310, location determiner 402, query grouper 404, index generator 406, query receiver 702, location predictor 704, and/or action performer 706 may be implemented as computer program code configured to be executed in one or more processors. Alternatively, search engine 106, advertisement selector 116, search system 120, search system 302, index generation module 304, location prediction module 310, location determiner 402, query grouper 404, index generator 406, query receiver 702, location predictor 704, and/or action performer 706 may be implemented as hardware logic/electrical circuitry.

Figure 11:
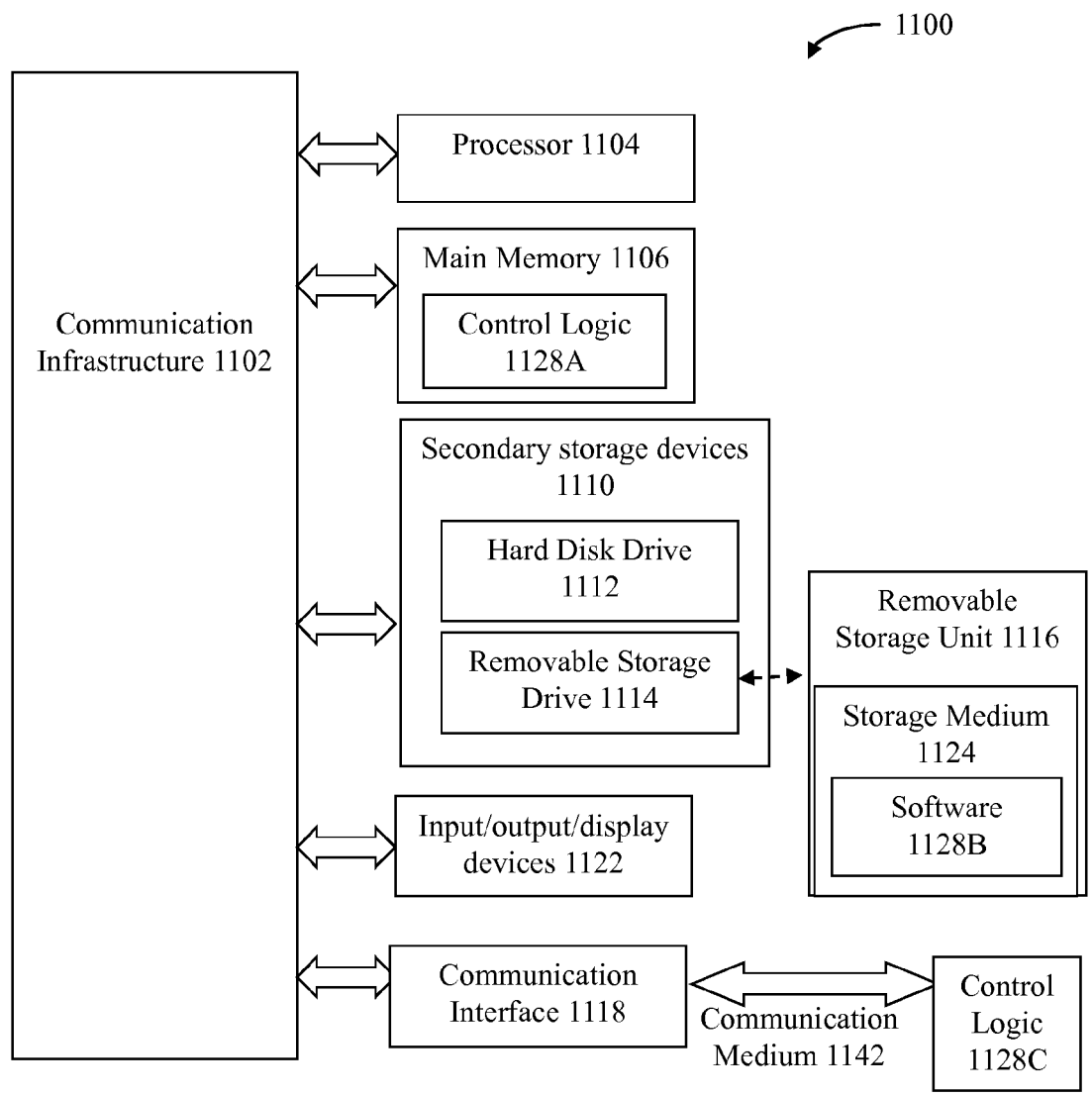
FIG. 11 is a block diagram of a computer in which embodiments may be implemented.

The embodiments described herein, including systems, methods/processes, and/or apparatuses, may be implemented using well known servers/computers, such as a computer 1100 shown in FIG. 11. For example, computers 104, search engine 106, advertisement selector 116, search system 120, search system 302, index generation module 304, location prediction module 310, and components or modules therein may be implemented using one or more computers 1100.

Computer 1100 can be any commercially available and well known computer capable of performing the functions described herein, such as computers available from International Business Machines, Apple, Sun, HP, Dell, Cray, etc. Computer 1100 may be any type of computer, including a desktop computer, a server, etc.

Computer 1100 includes one or more processors (also called central processing units, or CPUs), such as a processor 1104. Processor 1104 is connected to a communication infrastructure 1102, such as a communication bus. In some embodiments, processor 1104 can simultaneously operate multiple computing threads.

Computer 1100 also includes a primary or main memory 1106, such as random access memory (RAM). Main memory 1106 has stored therein control logic 1128A (computer software), and data.

Computer 1100 also includes one or more secondary storage devices 1110. Secondary storage devices 1110 include, for example, a hard disk drive 1112 and/or a removable storage device or drive 1114, as well as other types of storage devices, such as memory cards and memory sticks. For instance, computer 1100 may include an industry standard interface, such a universal serial bus (USB) interface for interfacing with devices such as a memory stick. Removable storage drive 1114 represents a floppy disk drive, a magnetic tape drive, a compact disk drive, an optical storage device, tape backup, etc.

Removable storage drive 1114 interacts with a removable storage unit 1116. Removable storage unit 1116 includes a computer useable or readable storage medium 1924 having stored therein computer software 1128B (control logic) and/or data. Removable storage unit 1116 represents a floppy disk, magnetic tape, compact disk, DVD, optical storage disk, or any other computer data storage device. Removable storage drive 1114 reads from and/or writes to removable storage unit 1116 in a well known manner.

Computer 1100 also includes input/output/display devices 1122, such as monitors, keyboards, pointing devices, etc.

Computer 1100 further includes a communication or network interface 1118. Communication interface 1118 enables the computer 1100 to communicate with remote devices. For example, communication interface 1118 allows computer 1100 to communicate over communication networks or mediums 1942 (representing a form of a computer useable or readable medium), such as LANs, WANs, the Internet, etc. Network interface 1118 may interface with remote sites or networks via wired or wireless connections.

Control logic 1128C may be transmitted to and from computer 1100 via the communication medium 1142.

Any apparatus or manufacture comprising a computer useable or readable medium having control logic (software) stored therein is referred to herein as a computer program product or program storage device. This includes, but is not limited to, computer 1100, main memory 1106, secondary storage devices 1110, and removable storage unit 1116. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic for search engine 106, advertisement selector 116, search system 120, search system 302, index generation module 304, location prediction module 310, location determiner 402, query grouper 404, index generator 406, query receiver 702, location predictor 704, action performer 706, flowchart 500, flowchart 800, flowchart 900, flowchart 910, and/or flowchart 1000 (including any one or more steps of flowcharts 500, 800, 900, 910, and 1000), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

VI. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for determining a geographic location of a user, the method comprising:
   receiving a query at a search engine from the user
   searching an inverted index to identify one or more geographical locations associated with one or more terms of the received query, wherein the inverted index comprises plurality of listed query terms, each of which is associated with at least one geographic location and respective relevance score associated therewith, wherein each respective relevance score indicates a level of relevancy of a respective geographical location with the listed query term and is computed based on previously submitted search query terms by at least one user and whether the previously submitted search query terms corresponds to a location specific search query
   selecting one of the identified one or more geographic locations as the geographic location of the user based on relevance scores associated with the search query and whether the search query is a location specific search query.

2. The method of claim 1, wherein the received query includes a plurality of terms, wherein said searching comprises:
   identifying in the inverted index a plurality of sets of geographical locations associated with the received query, each set of the plurality of sets of geographical locations being associated with a corresponding term of the received query; and
   wherein said selecting comprises: determining a subset of geographical locations that is an intersection of the sets of geographical locations; and
   selecting a geographical location from the subset of geographical locations to be the determined location for the user that submitted the received query.

3. The method of claim 2, wherein said selecting a geographical location from the subset of geographical locations to be the determined location for the user that submitted the received query comprises:
   identifying the relevance score for each of the geographical locations in the subset of geographical locations; and
   selecting the geographical location from the subset of geographical locations having the highest relevance score to be the determined location for the user that submitted the received query.

4. The method of claim 1, wherein the received query includes a plurality of terms, wherein said searching comprises:
   identifying in the inverted index a plurality of geographical locations associated with the received query; and
   identifying in the inverted index the relevance score for each of the plurality of geographical locations;
   wherein said selecting comprises:
   selecting a geographical location from the plurality of geographical locations having the highest relevance score to be the determined location for the user that submitted the received query.

5. The method of claim 1, wherein said searching comprises:
   searching a plurality of inverted indexes that correspond to a plurality of location groups to determine a plurality of geographical locations; and wherein said selecting comprises:
   selecting a geographical location from the determined plurality of geographical locations to be the determined location for the user that submitted the received query.

6. The method of claim 1, wherein said selecting comprises:
   displaying a heat map that shows the identified one or more geographical locations and indicates a relevance of each of the identified one or more geographical locations based on the relevance scores thereof.

7. The method of claim 1, further comprising:
   performing an action based on the determined geographical location.

8. The method of claim 7, wherein performing an action based on the determined geographical location comprises:
   selecting an advertisement at least in part based on the determined geographical location.

9. The method of claim 7, wherein performing an action based on the determined geographical location comprises:
   adjusting a list of search results for the received query based on the determined geographical location.

10. The method of claim 1, further comprising:
    generating the inverted index by:
    determining geographical locations for a plurality of users that submitted search queries, assigning a relevance score to each of the geographical locations based on whether the search query associated with that geographical location is a location-specific search query;

annotating each submitted search query with a determined geographical location for a user that submitted the search query, grouping the annotated search queries according to the determined geographical locations into a plurality of location groups, and building an inverted index for each location group that relates each term of the submitted search queries in the location group to one or more geographical locations determined for the users that submitted the search queries that include the terms, and to the corresponding relevance scores for the one or more geographical locations.

11. A method, comprising:

determining geographical locations for a plurality of users that submitted search queries;

assigning a relevance score to each of the geographical locations, wherein each relevance score indicates a level of relevancy of a respective geographical location with a search query associated with the geographical location and is computed based on whether the search query is a location-specific search query;

annotating each submitted search query with a determined geographical location for a user that submitted the search query;

grouping the annotated search queries according to the determined geographical locations into a plurality of location groups; and building an inverted index that relates each term of the submitted search queries in the location groups to one or more geographical locations determined for the users that submitted the search queries that include the terms, and to the relevance scores associated with the one or more geographical locations, wherein a geographical location of a new user who submits one of the search queries is determined based on the submitted one of the search queries according to the inverted index.

12. The method of claim 11, further comprising:

receiving a query from a user at a search engine;

searching the inverted index to identify one or more geographical locations associated with one or more terms of the received query;

selecting one of the identified one or more geographical locations as the geographical location of the user based on relevance scores associated with the search query and whether the search query is a location-specific search query; and performing an action based on the selected geographical location.

13. The method of claim 12, wherein the received query includes a plurality of terms, wherein said searching comprises:

identifying in the inverted index a plurality of sets of geographical locations associated with the received query, each set of the plurality of sets of geographical locations being associated with a corresponding term of the received query; and wherein said selecting comprises:

determining a subset of geographical locations that is an intersection of the sets of geographical locations; and selecting a geographical location from the subset of geographical locations to be the determined location for the user that submitted the received query.

14. The method of claim 13, wherein said selecting a geographical location from the subset of geographical locations to be the determined location for the user that submitted the received query comprises:

identifying the relevance score for each of the geographical locations in the subset of geographical locations; and selecting the geographical location from the subset of geographical locations having the highest relevance score to be the determined location for the user that submitted the received query.

15. The method of claim 12, wherein the received query includes a plurality of terms, wherein said searching comprises:

identifying in the inverted index a plurality of geographical locations associated with the received query; and identifying in the inverted index the relevance score for each of the plurality of geographical locations; wherein said selecting comprises:

selecting a geographical location from the plurality of geographical locations having the highest relevance score to be the determined location for the user that submitted the received query.

16. A system, comprising:

a processor;

a location determiner configured to determine, using the processor, geographical locations for a plurality of users that submitted search queries, and to annotate, using the processor, each submitted search query with a determined geographical location for a user that submitted the search query;

a query grouper configured to group, using the processor, the annotated search queries according to the determined geographical locations into a plurality of location groups; and an index generator configured to assign, using the processor, a relevance score to each of the geographical locations, wherein each relevance score indicates a level of relevancy of a respective geographical location with a search query associated with the geographical location and is computed based on whether the search query is a location-specific search query, and to build, using the processor, an inverted index that relates each term of the submitted search queries in the location groups to one or more geographical locations determined for the users that submitted the search queries that include the terms, and to the relevance scores associated with the one or more geographical locations, wherein a geographical location of a new user who submits one of the search queries is determined based on the submitted one of the search queries according to the inverted index.

17. The system of claim 16, wherein the inverted index includes a plurality of entries, each of the plurality of entries including:

first information that identifies a term within a query;

second information that identifies a geographical location associated with the term identified by the first information; and third information that identifies the relevance score of the geographical location identified by the second information to the term identified by the first information.

18. The system of claim 16, further comprising:

a query receiver configured to receive a search query from a user; and a location predictor configured to search the inverted index to identify a geographical location associated with the received search query as a determined location of the user that submitted the search query based at least on a comparison of a plurality of the relevance scores.

19. The system of claim 18, further comprising:
an action performer configured to perform an action based at least in part on the determined location of the user that submitted the search query.

* * * * *